United States Patent
Cottle et al.

(10) Patent No.: US 10,104,529 B2
(45) Date of Patent: *Oct. 16, 2018

(54) SENDING SAFETY-CHECK PROMPTS BASED ON USER INTERACTION

(71) Applicant: Facebook, Inc., Menlo Park, CA (US)

(72) Inventors: Peter Michael Cottle, Palo Alto, CA (US); Daniel Mark Ben-David, San Francisco, CA (US); Katherine Anne Woo, San Francisco, CA (US); Michael McIntyre, Jr., San Francisco, CA (US)

(73) Assignee: Facebook. Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/802,299

(22) Filed: Nov. 2, 2017

(65) Prior Publication Data

US 2018/0091963 A1 Mar. 29, 2018

Related U.S. Application Data

(63) Continuation of application No. 15/280,909, filed on Sep. 29, 2016, now Pat. No. 9,848,313.

(51) Int. Cl.
| | |
|---|---|
| *H04W 4/02* | (2018.01) |
| *H04W 4/90* | (2018.01) |
| *G06F 17/27* | (2006.01) |
| *H04L 12/58* | (2006.01) |
| *H04W 4/22* | (2009.01) |

(52) U.S. Cl.
CPC ............ *H04W 4/90* (2018.02); *G06F 17/278* (2013.01); *H04L 51/32* (2013.01); *H04W 4/02* (2013.01); *H04W 4/22* (2013.01)

(58) Field of Classification Search
CPC ......... G06Q 50/01; G06Q 30/02; H04W 4/22; H04W 4/008; H04W 4/025; H04W 76/007; H04W 4/021; H04W 76/02; G08B 25/016; G08B 25/10; G08B 15/004; G08B 21/22; G08B 25/00; G08B 25/001; H04L 67/12; H04L 67/26
See application file for complete search history.

(56) References Cited

U.S. PATENT DOCUMENTS

| | | | | |
|---|---|---|---|---|
| 2015/0358794 | A1* | 12/2015 | Nokhoudian | H04W 4/90 455/404.1 |
| 2017/0091617 | A1* | 3/2017 | Baughman | G06N 3/08 |
| 2017/0191843 | A1* | 7/2017 | Yadav | H04W 4/90 |

* cited by examiner

*Primary Examiner* — Quan M Hua
(74) *Attorney, Agent, or Firm* — Baker Botts L.L.P.

(57) ABSTRACT

In one embodiment, a method includes detecting that a first set of users associated with an emergency event have posted content related to the emergency event on an online social network. The method may also include sending a safety-check prompt to each of one or more users in the first set. The method may also include determining a current-prompting probability based on one or more engagement metrics of the one or more users in the first set. The method may also include sending, in response to determining that the current-prompting probability is above a threshold probability, the safety-check prompt to each of a second set of users. The second set of users may have more users than the first set of users.

20 Claims, 6 Drawing Sheets

SENDING SAFETY-CHECK PROMPTS BASED ON USER INTERACTION

PRIORITY

This application is a continuation under 35 U.S.C. § 120 of U.S. patent application Ser. No. 15/280,909, filed 29 Sep. 2016.

TECHNICAL FIELD

This disclosure generally relates to sending notifications during and after emergencies.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

SUMMARY OF PARTICULAR EMBODIMENTS

Natural or man-made disasters often cause fear and uncertainty. During an emergency in which a disaster is occurring or has just occurred, users of an online social network may wish to check on their friends and loved ones who may be affected by the disaster. Users affected by the disaster may wish to let others know whether they are safe. In particular embodiments, the social-networking system may send a safety-check prompt to a user during an emergency. The safety-check prompt may request the user to specify whether she is safe, not safe, or out of the affected area of the emergency. As an example and not by way of limitation, an explosion in Manhattan, a borough in New York City, may cause the social-networking system to send safety-check prompts to users living in Manhattan. The safety-check prompt may state: "Are you okay? It looks like you're in the area affected by the explosion. Let your friends know you're safe." The user may then select whether or not she is safe, or if she is not in the area. In particular embodiments, it may be undesirable for the social-networking system to send a safety-check prompt to users, even though the social-networking system may have identified an actual emergency. As an example and not by way of limitation, the social-networking system may identify a tropical storm in the Philippines. Although this may be an emergency, it may be a mild storm by local standards; thus users of the online social network may not be concerned whether their friends and family are safe or not. In this situation, the social-networking system should not send a safety-check prompt.

To gauge user engagement with a particular safety-check prompt and determine whether it should send the safety-check prompt to a large number of users, the social-networking system may first identify an emergency event, then monitor user posts to determine whether a threshold number of users associated with the event have posted content related to the event. If a threshold number of users associated with the event have posted content, the social-networking system may send a safety-check prompt to a first set of users as a "test batch." This may be to gauge user-interest in the safety-check prompt. The first set of users may be selected at random from the group of users associated with the emergency who have already posted content related to the event. The social-networking system may then determine a current-prompting probability for the safety-check prompt or for one or more individual users. The current-prompting probability may represent how likely it is for a user or users to respond to the safety-check prompt and may be based on one or more engagement metrics. The engagement metrics may be based on an individual user's social graph data (e.g., affinity to particular concepts, posting frequency), or on groups of users (e.g., the percentage of users who have responded or ignored the safety-check prompt). If the current-prompting probability is above a threshold probability, the social-networking system may send the safety-check prompt to a second set of users that is larger than the first set of users. At one or more later points in time (e.g., at regular intervals or in real-time), the social-networking system may re-calculate the current-prompting probability, and determine to send the safety-check prompt to users at a steady rate, increased rate, or decreased rate based on the current-prompting probability. This may be thought of as tiered-delivery of the safety-check prompt based on the current-prompting probability.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
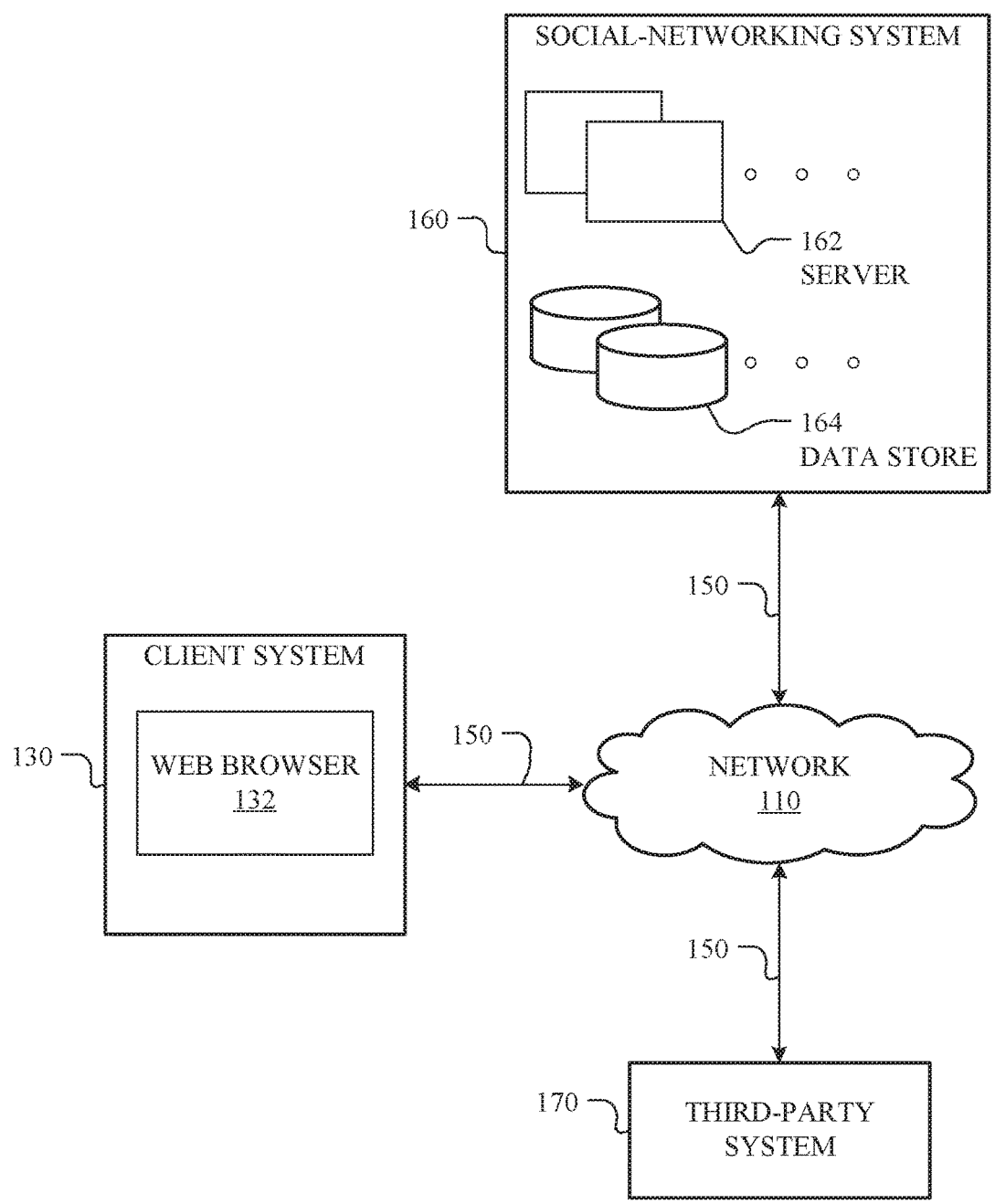
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOC SIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. As an example and not by way of limitation, client system 130 may access social-networking system 160 using a web browser 132, or a native application associated with social-networking system 160 (e.g., a mobile social-networking application, a messaging application, another suitable application, or any combination thereof) either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 to whom they want to be connected. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Figure 2:
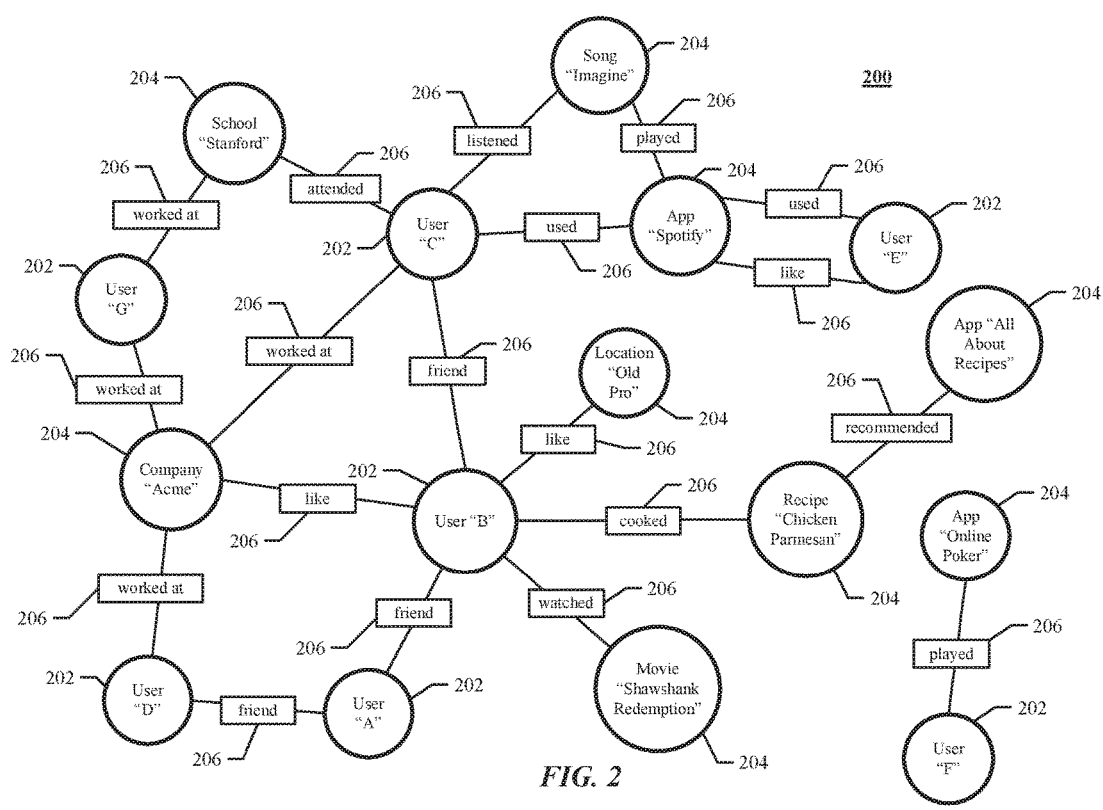
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to social-networking system 160 a message indicating the user's action. In response to the message, social-networking system 160 may create an edge (e.g., a check-in-type edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 164. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to an edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

In particular embodiments, social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 160 may calculate a coefficient based on a user's actions. Social-networking system 160 may monitor such actions on the online social network, on a third-party system 170, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 160 may calculate a coefficient based on the user's actions with particular types of content. The content may be associated with the online social network, a third-party system 170, or another suitable system. The content may include users, profile pages, posts, news stories, headlines, instant messages, chat room conversations, emails, advertisements, pictures, video, music, other suitable objects, or any combination thereof. Social-networking system 160 may analyze a user's actions to determine whether one or more of the actions indicate an affinity for subject matter, content, other users, and so forth. As an example and not by way of limitation, if a user frequently posts content related to "coffee" or variants thereof, social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 160 may calculate a coefficient based on the type of relationship between particular objects. Referencing the social graph 200, social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in a first photo, but merely likes a second photo, social-networking system 160 may determine that the user has a higher coefficient with respect to the first photo than the second photo because having a tagged-in-type relationship with content may be assigned a higher weight and/or rating than having a like-type relationship with content. In particular embodiments, social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, social-networking system 160 may determine that the user has a higher coefficient for the airport than the gas station based on the proximity of the airport to the user.

In particular embodiments, social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 160 may provide information that is relevant to user's interests and current circumstances, increasing the likelihood that they will find such information of interest. In particular embodiments, social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, social-networking system 160 may calculate the coefficient (or access the coefficient information if it has previously been calculated and stored). In particular embodiments, social-networking system 160 may measure an affinity with respect to a particular process. Different processes (both internal and external to the online social network) may request a coefficient for a particular object or set of objects. Social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

Natural or man-made disasters often cause fear and uncertainty in communities. During an emergency, users of an online social network may wish to check on their friends and loved ones who may be affected by the disaster, or, for users affected by the disaster, they may wish to let others know whether they are safe. In particular embodiments, social-networking system 160 may send a safety-check prompt to a user during an emergency. The safety-check prompt may request the user to specify whether she is safe, not safe, or out of the affected area of the emergency. As an example and not by way of limitation, an explosion in Manhattan may cause social-networking system 160 to send safety-check prompts to users living in Manhattan. The safety-check prompt may state: "Are you okay? It looks like you're in the area affected by the explosion. Let your friends know you're safe." The user may then select whether or not she is safe, or if she is not in the area. In particular embodiments, it may be undesirable for social-networking system 160 to send a safety-check prompt to users, even though social-networking system 160 may have identified an actual emergency. As an example and not by way of limitation, social-networking system 160 may identify a tropical storm in the Philippines. Although this may be an emergency, it may be a mild storm by local standards; thus users of the online social network may not be concerned with whether their friends and family are safe or not. In this situation, social-networking system 160 should not send a safety-check prompt.

To gauge user engagement with a particular safety-check prompt and determine whether it should send the safety-check prompt to a large number of users, social-networking system 160 may first identify an emergency event, then monitor user posts to determine whether a threshold number of users associated with the event have posted content related to the event. If a threshold number of users associated with the event have posted content, social-networking system 160 may send a safety-check prompt to a first set of users as a "test batch." This may be to gauge user-interest in the safety-check prompt. The first set of users may be selected at random from the group of users associated with the emergency who have already posted content related to the event. "Associated with the emergency event" may mean that the user is in the geographic area of the geographic event as determined by a GPS on his client system 130 or by his social graph information (e.g., by checking in at a location close to the emergency) or by otherwise being substantially affected by the emergency (e.g., the user is a victim or potential victim of a cyber attack because he owns a device that operates WINDOWS 10 and WINDOWS 10 was recently hacked), as will be explained below. Social-networking system 160 may then determine a current-prompting probability for the safety-check prompt or for one or more individual users. The current-prompting probability may represent how likely it is for a user or users to respond to the safety-check prompt and may be based on one or more engagement metrics. The engagement metrics may be based on an individual user's social graph data (e.g., affinity to particular concepts, posting frequency), or on groups of users (e.g., the percentage of users who have responded to or ignored the safety-check prompt). If the current-prompting probability is above a threshold probability, social-networking system 160 may send the safety-check prompt to a second set of users that is larger than the first set of users. At one or more later points in time (e.g., at regular intervals or in real time), social-networking system 160 may re-calculate the current-prompting probability, and determine to send the safety-check prompt to users at a steady rate, increased rate, or decreased rate based on the current-prompting probability. This may be thought of as tiered-delivery of the safety-check prompt based on the current-prompting probability. The above process will now be explained in greater detail.

In particular embodiments, social-networking system 160 may identify an emergency event. The emergency event may be any type of emergency, natural or manmade, that causes public concern or fear. The emergency may be life-threatening or may simply cause apprehension among the public. Examples of natural emergencies that social-networking system 160 may identify are earthquakes, tornados, floods, hurricanes, wildfires, or any other suitable type of emergency. Examples of manmade emergencies may include shootings, bombings, plane or bus hijackings, or other terrorist activities, accidental disasters, such as gas line explosions, oil leaks, gas leaks, nuclear reactor meltdowns, the release of a pathogen into the air or water supply, or any other type of emergency. In particular embodiments, the emergency need not threaten harm to life or limb; the emergency may be a cyber attack, an economic disaster, a computer-security threat, or any other type of suitable emergency. As an example and not by way of limitation, an emergency that social-networking system 160 may identify may be a widespread identity theft of users' names, social security numbers, or financial information. Although this disclosure describes particular emergencies, this disclosure contemplates any suitable emergencies.

In particular embodiments, social-networking system 160 may monitor an alert feed that may be maintained either by social-networking system 160 or by a third-party. The alert feed may comprise one or more items that correspond to a disaster or other event worthy of public concern. Examples of items on an alert feed may include a fire in Boston, Mass., a gas line explosion in Plano, Tex., a shooting in Orlando, Fla., a typhoon in the Philippines, and a bomb explosion in Baghdad, Iraq. The alert feed may also include less serious events, such as power outages and flight delays. In particular embodiments, social-networking system 160 may crowd-source the emergency event feed. This may be understood to mean that users of the online social network may post or submit content related to an emergency to the online social network. In particular embodiments, a user may fill out a disaster-notice form to indicate that a disaster has occurred or is currently occurring in the user's area. In particular embodiments, a user may simply post content as a status update that is related to an emergency, and social-networking system 160 may determine that it is related to a particular emergency based on natural language processing. If a threshold number of users post or submit content related to a particular emergency, social-networking system 160 may recognize the emergency as warranting a safety-check prompt, and may proceed with the steps of the method described herein. Although this disclosure describes monitoring an alert feed in a particular manner, this disclosure contemplates monitoring an alert feed in any suitable manner.

In particular embodiments, social-networking system 160 may identify one or more qualifying emergencies from the list of items on an alert feed. An item on an alert feed may need to meet one or more emergency metrics to become a qualifying event. The purpose of identifying a qualifying event may be to ensure social-networking system 160 sends safety-checks related to events that most would consider a real emergency, and not merely an inconvenience. As an example and not by way of limitation, if a power outage causes several flight delays, this event may appear on an alert feed. But these flight delays may be merely annoying rather than fear-inducing. In such a situation, it may be undesirable for social-networking system 160 to send a safety-check about the flight delays to users, even though many users may post status updates that are related to the flight delays. Thus, an item on an alert feed may need to meet particular emergency metrics in order to become a qualifying emergency. Examples of emergency metrics may include: the event must impact at least a threshold number of users (e.g., a two-car collision on a highway may not meet the requirements); the event must cause public fear or apprehension (e.g., a power outage is an inconvenience, but may not induce fear or be particularly threatening); or the item in an alert feed must include at least one trigger word (e.g., "fire," "shooting," "earthquake," "bomb," "riot," etc.). In particular embodiments, the social-networking system 160 may upgrade a non-qualifying event to a qualifying emergency based on events related to the non-qualifying event. As an example and not by way of limitation, a power outage may be a non-qualifying event because it is not life threatening or fear-inducing, but if the power outage leads to looting and rioting, social-networking system 160 may upgrade the power outage to a qualifying event, because of the looting and rioting. In particular embodiments, social-networking system 160 may filter out particular items on an alert feed based on language processing (e.g., keyword matching). As an example and not by way of limitation, power outages, flight delays, and traffic jams may be automatically filtered from an alert feed. Although this disclosure describes identifying a qualifying emergency event in a particular manner, this disclosure contemplates identifying qualifying emergency events in any suitable manner.

In particular embodiments, social-networking system 160 may send users of the online social network that have been affected by the emergency event a safety-check prompt that invites a user to check-in with the online social network, so that the users can let their friends and family know they are safe. However, social-networking system 160 may not immediately recognize when sending a safety-check prompt is appropriate and when a safety-check prompt is inappropriate. As an example and not by way of limitation, a shooting in Jakarta, Indonesia may not have an unusually high number of casualties, so the social-networking system 160 may not send safety-check prompts to users in the area, but the shooting may cause a high level of public fear or uncertainty. Users may want to post status updates letting their friends and family know that they are safe. Thus, it may be desirable to send safety-check prompts to users in such a situation. On the other hand, social-networking system 160 may send safety-check prompts to users in the Philippines, where a typhoon may be predicted to hit. However, if the typhoon ends up being mild for Philippine standards, few users will interact with the safety-check prompt. In such a scenario, it may be undesirable to send a safety-check prompt to users.

In particular embodiments, social-networking system 160 may overcome this problem by determining that a threshold percentage of users who are associated with the emergency event have posted content related to the emergency event to the online social network. When a disaster strikes, users of the online social network may post status updates, photos, videos, and other content to the online social network. Social-networking system 160 may monitor or analyze these posts and use them as a signal of user interest in the emergency event. In particular embodiments, social-networking system 160 may use natural language processing (e.g., sentiment analysis) to determine the attitude of one or more users related to the emergency event. As an example and not by way of limitation, a user may post a status update that relates to a flood in Texas. The status update may say, "The flood destroyed our house, but thankfully my family and I are okay." Social-networking system 160 may analyze this status update and determine that this status update is an indication that the flood in Texas is an emergency event worthy of a safety-check prompt. In particular embodiments, determining that a threshold percentage of users associated with the emergency event have posted content related to the emergency event may comprise determining which users have posted content to the online social network within a threshold timeframe (e.g., since the time that the emergency event began); determining that the user is associated with the emergency event (e.g., the user is in the geographic area of the emergency event); extracting one or more text strings from the posted content; and applying a natural language analysis (e.g., as described above) to determine that the text strings comprise one or more n-grams that are related to the emergency event. Although this disclosure describes using natural language processing to determine whether an emergency event warrants a safety-check prompt in a particular manner, this disclosure contemplates using natural language processing to determine whether an emergency event warrants a safety-check prompt in any suitable manner.

In particular embodiments, social-networking system 160 may also look at minutiae associated with posts. Minutiae may be associated with a post and may comprise the user's sentiment or activity during the event. In particular embodiments, minutiae may include metadata that a user may add to a post. Examples of minutiae include "I'm feeling . . . " or "I'm watching . . . " and the user may fill in the minutiae with various options, such as "happy" in the case of "I'm feeling . . . ." As an example and not by way of limitation, a user may post a status update about an earthquake in San Francisco, Calif., and include minutiae that states "feeling scared." Social-networking system 160 may take this minutiae as a signal that the earthquake in San Francisco is an emergency event worthy of a safety-check prompt. As another example and not by way of limitation, a user may post a status update about a storm in Washington D.C. that was predicted to cause major damage, but ended up being relatively mild. The status update may include minutiae that states "feeling underwhelmed." Social-networking system 160 may take this minutiae as a signal the storm in Washington D.C. is not an emergency event worthy of a safety-check prompt. Although this disclosure describes using minutiae to determine whether an emergency event warrants a safety-check prompt in a particular manner, this disclosure contemplates using minutiae to determine whether an emergency event warrants a safety-check prompt in any suitable manner.

In particular embodiments, social-networking system 160 may use a machine learning algorithm to determine what kind of status update, minutiae, or other content posted to the online social network indicates that an emergency event warrants sending users a safety-check prompt. As an example and not by way of limitation, the machine learning algorithm may be trained on training data, wherein the algorithm takes as input several hundred or several thousand posts related to different potential emergencies, some of which are serious (e.g., the life-threatening flood in Texas), and some of which are not serious (e.g., the underwhelming storm in Washington D.C.). The machine learning algorithm may analyze the n-grams in the status updates, the data in any photos or videos posted, or the minutiae associated with the status updates to predict which posts are associated with emergency events that warrant a safety-check prompt and which events do not warrant a safety-check prompt. Although this disclosure describes implementing a machine learning algorithm to predict whether an emergency event warrants a safety-check prompt in a particular manner, this disclosure contemplates implementing a machine learning algorithm to predict whether an emergency event warrants a safety-check prompt in any suitable manner.

In particular embodiments, social-networking system 160 may consider a threshold number of users who have posted content related to the emergency event, rather than a threshold percentage of users. As an example and not by way of limitation, in response to a brushfire in Southern California, 10,000 users may post content related to the brushfire. This number may be small compared to all the users of the online social network in Southern California, so the percentage of users who have posted content related to the emergency event may be below the requisite threshold percentage. But social-networking system 160 may determine that the number of users who have posted content related to the brushfire is above a threshold number (e.g., 8,000 users). Because the number of users exceeds the threshold number, social-networking system 160 may proceed to the next step. Although this disclosure describes determining that a threshold number of users have posted content related to an emergency event in a particular manner, this disclosure contemplates determining that a threshold number of users have posted content related to an emergency event in any suitable manner.

Figure 4:
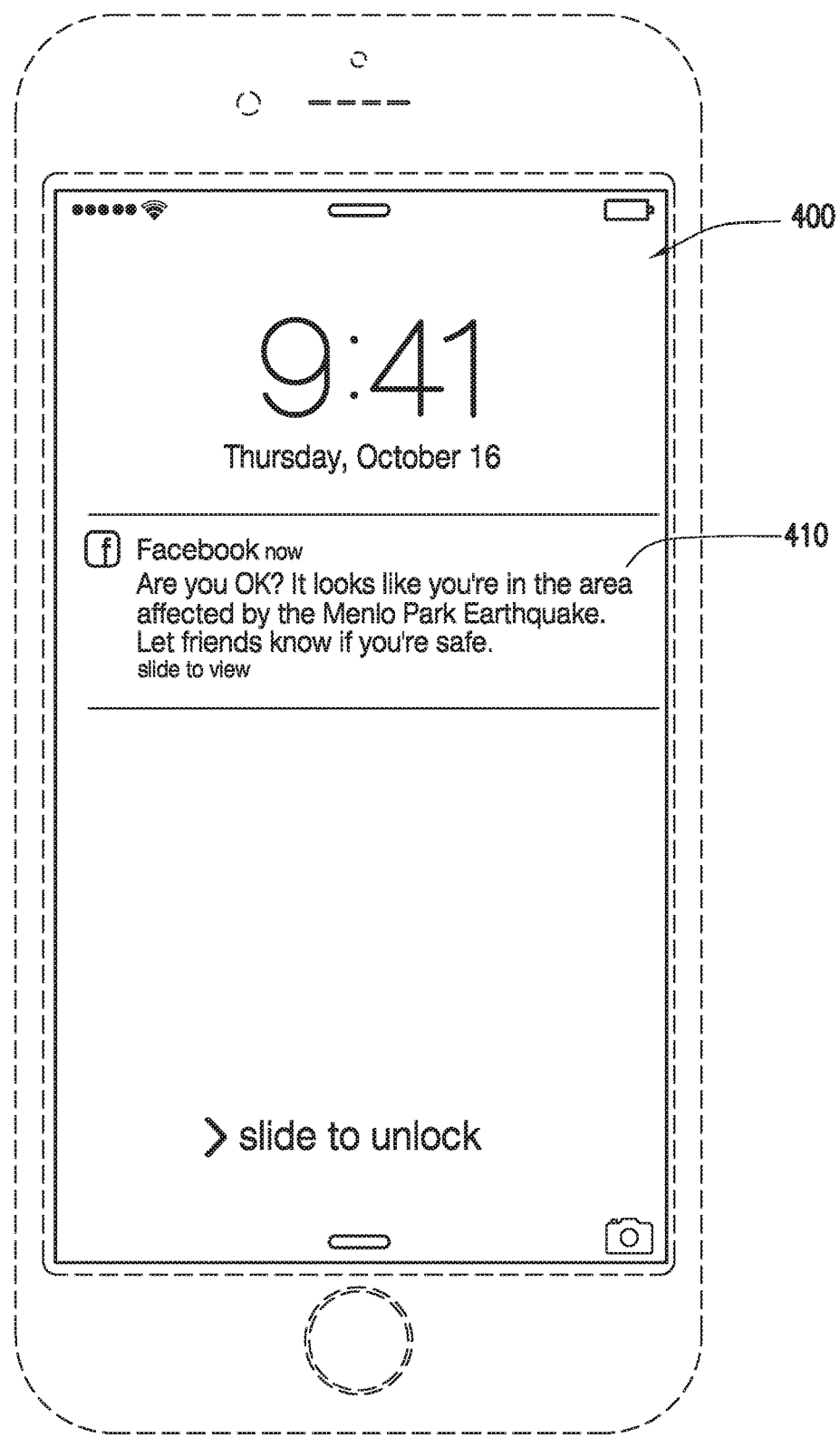
FIG. 4 illustrates an example notification interface comprising a safety-check prompt notification.

In particular embodiments, social-networking system 160 may send a safety-check prompt to each of a first set of users. Social-networking system 160 may send the safety-check prompt in response to determining that a threshold percentage (or, alternatively, number) of users who are associated with the emergency event have posted content related to the emergency event to the online social network. The first set of users may be a relatively small set of users. In particular embodiments, the first set of users may be considered to be a "test batch" of users. Social-networking system 160 may send the safety-check prompt to relatively few users in order to gauge user interaction with the safety-check prompt before sending it to a large amount of users. This way, if the emergency event does not warrant a safety-check prompt, social-networking system 160 may determine this fact without sending the safety-check prompt to a large number of users. In particular embodiments, the first set of users may be selected at random from among the users who are associated with the emergency event and have posted content related to the emergency event. Furthermore, the emergency event may be associated with a particular geographic location, and each user in the first set of users and each user in the second set of users is also associated with the particular geographic location. As an example and not by way of limitation, an emergency event may be an explosion at the Los Angeles International Airport. Within a relatively short amount of time after the explosion (e.g., 1 hour), 2,000 users may have posted content on the online social network related to the explosion. Of those 2,000 users, 700 may be in the geographic region of the explosion (e.g., inside the airport). The posts by the 700 users may satisfy the requirement that a threshold percentage of users associated with the emergency event have posted content related to the emergency event. In response, social-networking system 160 may send, to a smaller subset of those 700 users (e.g., 100 users), a safety-check prompt that says, "Are you OK? It looks like you're in the area affected by the LAX Airport explosion. Let friends know if you're safe." FIG. 4 illustrates an example notification similar to the notifications described here. Each user who receives the safety-check prompt may have the option to either respond to the safety-check prompt, or to ignore it. Although this disclosure describes sending a safety-check prompt to users in a particular manner, this disclosure contemplates sending a safety-check prompt to users in any suitable manner.

In particular embodiments, the emergency event may not be associated with a particular geographic location, but rather may be associated with some other criteria. Such criteria may include membership in a particular organization (e.g., the CHURCH OF SCIENTOLOGY, the REPUBLICAN PARTY), subscription to a particular service (e.g., GMAIL, MORGAN STANLEY WEALTH MANAGEMENT), ownership of a particular product (e.g., an IPHONE, a TOYOTA PRIUS) or any other suitable criteria. As an example and not by way of limitation, an emergency event may be a cyber attack on hundreds of thousands of people who have a WINDOWS operating system. The cyber attack may have infiltrated these people's computers and gathered private financial information about them. Within a relatively short amount of time after the attack (e.g., 1 day), 2,000 users may have posted content on the online social network related to the cyber attack. Of those 2,000 users, 1,200 may be WINDOWS users. The posts by the 1,200 users may satisfy the requirement that a threshold percentage of users associated with the emergency event have posted content related to the emergency event. In response, social-networking system 160 may send, to a smaller subset of those 1,200 users (e.g., 100 users), a safety-check prompt that says, "Have you been hacked? It looks like you're running WINDOWS, which has been the victim of a cyber attack. Let friends know if you've been hacked." FIG. 4 illustrates an example notification similar to the notifications described here. Each user who receives the safety-check prompt may have the option to either respond to the safety-check prompt, or to ignore it. Although this disclosure describes sending a safety-check prompt to users in a particular manner, this disclosure contemplates sending a safety-check prompt to users in any suitable manner.

Figure 3:
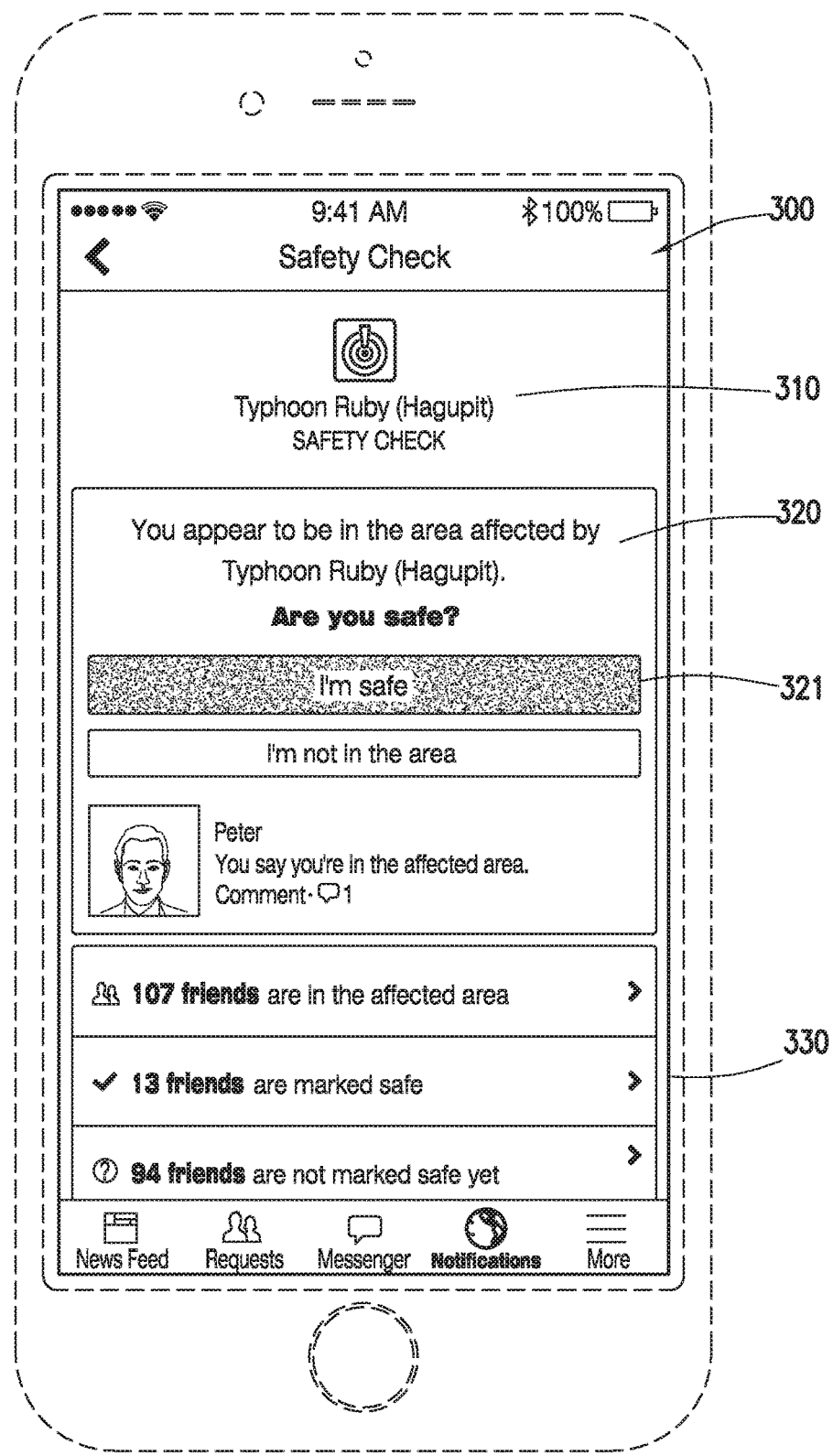
FIG. 3 illustrates an example user interface of a safety check for an example emergency.

FIG. 3 illustrates an example user interface 300 of a safety check for an example emergency. User interface 100 may be displayed once a user opens a notification 410 that comprises the safety-check prompt. User interface 100 may comprise an emergency panel 310, safety-check panel 320, and friend-status panel 330. Emergency panel 310 may display information about the particular emergency related to the safety-check prompt. As an example and not by way of limitation, emergency panel 310 may state that Typhoon Ruby is currently affecting an area that the social-networking system 160 may associate with the user, either because the GPS unit in the user's client device 130 indicates that the user is located in the affected geographic area, or the user specified that she is currently living in an area affected by the emergency event. Emergency panel 310 may comprise additional information, such as statistics or headlines related to the emergency event, as well as any directions safety officials wish to communicate to the public. As an example and not by way of limitation, emergency panel 310 may comprise text that states "130 mph winds. Officials advise everyone to stay indoors." Safety-check panel 320 may comprise text and selectable icons 321 whereby the user may designate his safety status. As an example and not by way of limitation, safety-check panel 320 may comprise text that states: "You appear to be in the area affected by Typhoon Ruby. Are you safe?" Safety-check panel 320 may further comprise selectable icons 321 that state, "I'm safe," "I'm not in the area," or "I'm not safe." If the user selects the "I'm not safe" icon, this information may be given to emergency personnel, who may then contact the user or send aid to the user. If the user selects the "I'm safe" icon, the social-networking system 160 may display an option for the user to post a status update indicating this information, so that her friends and family know she is safe. Friend-status panel 330 may display the status of the user's friends on the online social network. Although this disclosure describes displaying a user interface of a safety check in a particular manner, this disclosure contemplates displaying a user interface of a safety check in any suitable manner.

FIG. 4 illustrates an example notification interface 400 comprising a safety-check prompt notification 410. In particular embodiments, when social-networking system 160 determines to send a safety-check prompt to a user, it may send the safety-check prompt in the form of a notification (e.g., safety-check prompt notification 410) on a lock screen or notification interface 400 of the client system of the user.

When the user receives the safety-check prompt notification, the user may interact with the notification by swiping or tapping on it or otherwise selecting it, or the user may ignore the notification. Although this disclosure contemplates sending a safety-check prompt notification to a user in a particular manner, this disclosure contemplates sending a safety-check prompt notification to a user in any particular manner.

In particular embodiments, the current-prompting probability may be based on one or more batch-specific engagement metrics. These engagement metrics may be measured across all users who have received a safety-check prompt from social-networking system 160. Alternatively, the engagement metrics may be measured across particular batches of users who have received the safety-check prompt. As an example and not by way of limitation, social-networking system 160 may measure the engagement metrics for the first set of users that received the safety-check prompt (e.g., "test batch" of users). In particular embodiments, the engagement metrics may include (1) the number or percentage of users who have interacted with the safety-check prompt (e.g., marked themselves safe, unsafe, or not in the area by selecting one of the icons 321); (2) The number or percentage of users who hide or otherwise disable the safety-check prompt in their newsfeed; and (3) the number of users who have viewed the safety-check prompt. The first engagement metric may affect the current-prompting probability by raising the current-prompting probability as more users interact with the safety-check prompt, because this may be an indication that users of the online social network are eager to share their safety status with their friends and family. The second engagement metric may affect the current-prompting probability by lowering the current-prompting probability as more users hide or otherwise disable the safety-check prompt in their newsfeed, because this may be an indication that users are not interested in sharing whether or not they are safe. The third engagement metric may affect the current-prompting probability by lowering the current-prompting probability as more users see the safety-check prompt but ignore it, because this may be an indication that users are not interested in sharing whether or not they are safe. As an example and not by way of limitation, the current-prompting probability for a given emergency and set of users may be expressed as:

$$CPP = \frac{(\# \text{ of interactions}) - (\# \text{ of hides})}{\# \text{ of impressions}}$$

In the above equation, CPP is the current-prompting probability, "# of interactions" is the number of users who have marked their safety status using icons 321, "# of hides" is the number of users who have hid or otherwise disabled the safety-status prompt on their newsfeed, and "# of impressions" is the total number of users who have viewed the safety-check prompt on their client system 130. As an example and not by way of limitation, if social-networking system 160 sends a safety-check prompt for a particular emergency event to 300 users, 290 users view the safety-check prompt, 200 users respond to the safety-check prompt by selecting one of the icons 321, and 50 users hide the safety-check prompt, the current-prompting probability may be (200−50)/290=51.7%. In particular embodiments, the current-prompting probability may be determined at regular time intervals. These time intervals may be every minute, every five minutes, every hour, or any other suitable time interval. As an example and not by way of limitation, social-networking system 160 may calculate the current-prompting probability every ten minutes. Thus, ten minutes after sending out the safety-check prompt to the 300 users, social-networking system 160 may measure the engagement metrics to be those listed above (e.g., 290 impressions, 200 interactions and 50 hides). Then, twenty minutes after sending the safety-check prompt to the 300 users, social-networking system 160 may measure the engagement metrics again and find that 8 more users have viewed the safety-check prompt and all 8 have responded by selecting one of the icons 321. Thus, the current-prompting probability after the second interval (e.g., twenty minutes) may be (208−50)/298=53.0%. In particular embodiments, social-networking system 160 may calculate the current-prompting probability in real-time. Real-time calculation of the current-prompting probability may mean that the current-prompting probability is calculated every time a user interacts with (or, in particular embodiments, ignores) a safety-check prompt. The calculation may be made within a fraction of a second from the time a given user interacts with or ignores the safety-check prompt. By performing a real-time calculation of the current-prompting probability, social-networking system 160 may be able to more accurately predict user response rates during potential or actual emergency events. Although this disclosure describes determining a current-prompting probability in a particular manner, this disclosure contemplates determining a current-prompting probability in any suitable manner.

In particular embodiments, the social-networking system 160 may determine a current-prompting probability for an individual user based on one or more user-specific engagement metrics. The current-prompting probability may represent the likelihood that a user will interact with a safety-check prompt. In particular embodiments, a current-prompting probability similar to the current-prompting probability calculated above for batches of users may be applied to each user individually, based on several factors, including the user's social graph information (e.g., past posts) and the response rate of other similar users (e.g., in the same geographic location, or similar age, background, etc.). As an example and not by way of limitation, social-networking system 160 may determine a current-prompting probability for a particular user, Ethan, regarding a particular emergency event (e.g., a bomb explosion in Manhattan). Social-networking system 160 may determine Ethan's current-prompting probability based on one or more of the following criteria: (1) the number of users who have already interacted with the safety-check prompt, which may be the users in the first set of users (e.g., "test batch" of users), or may be users in subsequent sets of users; (2) Ethan's social graph information. This information may include data on how often Ethan posts to the online social network, the type of content that he posts about, whether he interacts with other notifications sent to him by social-networking system 160, and his likes, interests, and concepts with which he has a strong affinity; and (3) the similarity between Ethan and other users who have either interacted with or ignored the safety-check prompt. For example, if Ethan's social graph data is similar to users who have interacted with the safety-check prompt by specifying that they were safe, Ethan's current-prompting probability may be higher than if users similar to Ethan ignored or hid the safety check prompt. This calculation may be based on an observation that users with similar social graph data (e.g., similar interests, education, friends, etc.) act similarly on the online social network. In particular embodiments, social-networking system 160 may calculate the current-prompting probability for individual users in real-time. Real-time calculation of the current-prompting probability for individual users may mean that the current-prompting probability is calculated before social-networking system 160 makes a final determination to send a safety-check prompt to a particular user. As an example and not by way of limitation, social-networking system 160 may determine a current-prompting probability for a user, Ethan. This determination may be made prior to determining to send a safety-check prompt to Ethan. If the current-prompting probability for Ethan is above a threshold probability, social-networking system 160 may send a safety-check prompt to Ethan. Although this disclosure describes determining a current-prompting probability in a particular manner, this disclosure contemplates determining a current-prompting probability in any suitable manner.

Figure 5:
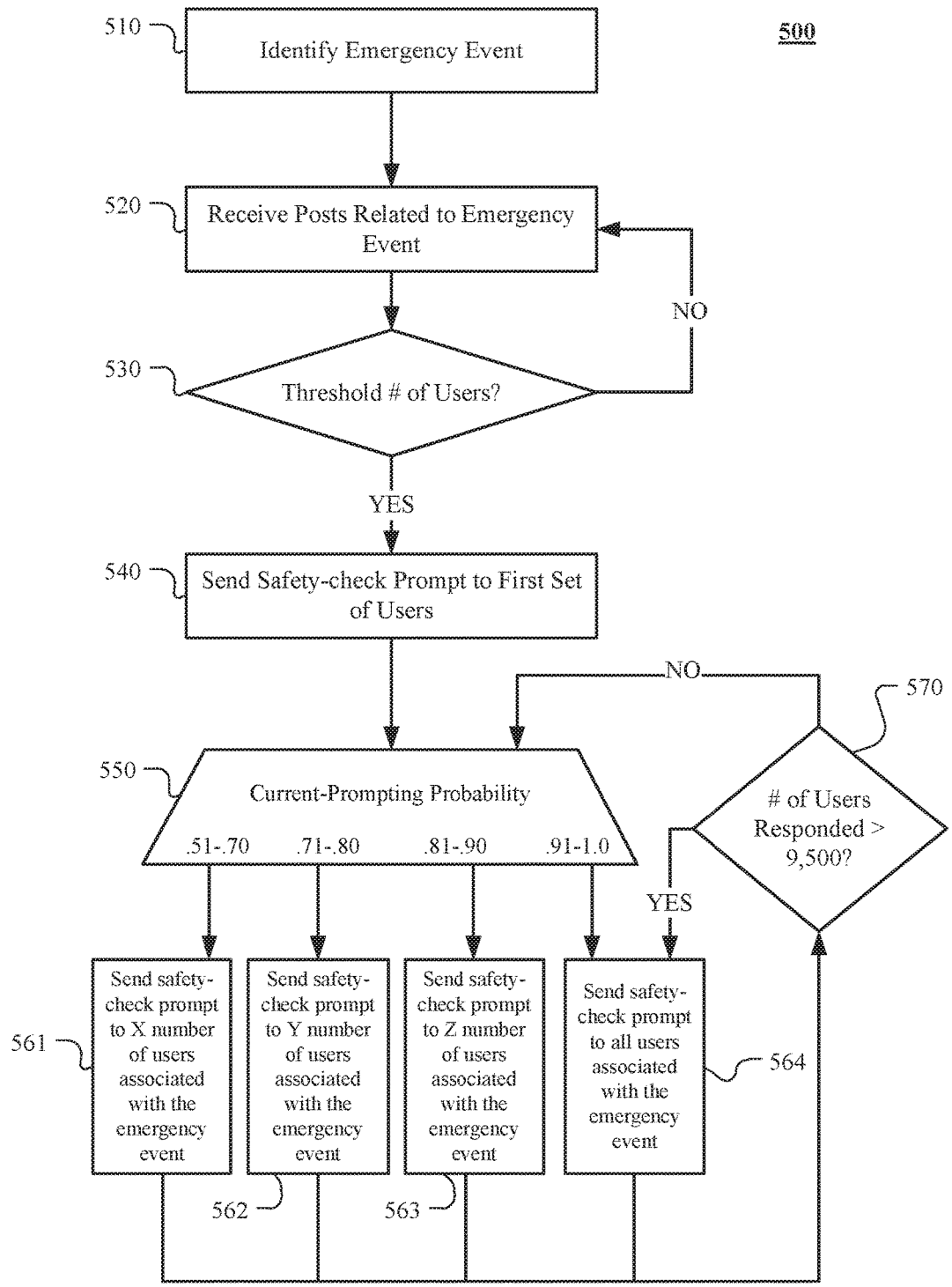
FIG. 5 illustrates an example method for determining to send a safety-check prompt based on user interaction.

In particular embodiments, social-networking system 160 may, in response to determining that the current-prompting probability is above a threshold probability, send the safety-check prompt to each of a second set of users. In particular embodiments, the second set of users may comprise more users than the first set of users. As an example and not by way of limitation, social-networking system 160 may identify an emergency event, determine that a threshold percentage of users associated with the emergency event have posted about the event, and send a safety-check prompt to a first set of users. The first set of users may comprise 100 users. As users respond to or ignore the safety check prompt, social-networking system 160 may calculate the current-prompting probability at regular intervals (e.g., 10 minute intervals). If the current-prompting probability surpasses a threshold probability, social-networking system may send the safety-check prompt to a second set of users. The second set of users may comprise 500 users who are associated with the emergency event. The second set of users may be users who either have or have not already posted content related to the emergency event to the online social network. As an example and not by way of limitation, the threshold probability may be 0.5. In other words, social-networking system 160 may send the safety-check prompt to each of a second set of users if it is more likely than not that the second set of users will interact with the safety-check prompt by selecting one of the icons 321. Social-networking system 160 may only send safety-check prompts to users who are associated with the emergency event, either because the user is in the same geographic region as the emergency, or for any other suitable reason. In particular embodiments, instead of sending the safety-check prompt to a second set of users if the current-prompting probability is above a threshold probability, social-networking system 160 may send the safety-check prompt to an increasing amount of users in a tier-based system based on a plurality of probability intervals. FIG. 5 illustrates an example of such a tier-based system. At step 550, social-networking system 160 may calculate the current-prompting probability, and if the current-prompting probability falls into one of a plurality of probability intervals, social-networking system 160 may send the safety-check prompt to a corresponding number of users. As an example and not by way of limitation, the probability intervals may be 0.51-0.70, 0.71-0.80, 0.81-0.90, and 0.91-1.0. These intervals are examples only, and may comprise any suitable probability interval. If the current-prompting probability falls into the first probability interval, social-networking system 160 may send the safety-check prompt to a first number of users. This first number of users may be an absolute number (e.g., 500 users), or a percentage of users who are associated with the emergency event (e.g., 15%). In particular embodiments, each increasing probability interval corresponds with an increasing number of users. As an example and not by way of limitation, social-networking system 160 may send a safety-check prompt to an example number of users or example percentage of users based on example probability intervals in the following manner:

| Probability Interval | Number of Users to Receive Safety-Check Prompt | Percentage of Users Associated with Emergency to Receive Safety-Check Prompt |
| --- | --- | --- |
| .51-70 | 1000 | 15% |
| .71-80 | 3000 | 50% |
| .81-.90 | 8000 | 75% |
| .91-1.0 | 10000 | 100% |

In particular embodiments, the users who are sent the safety-check prompt may be selected at random from either one or both of two groups: (1) users who are associated with the emergency (e.g., they live in the area or are otherwise affected) and have already posted content about the emergency on the online social network; and (2) users who are associated with the emergency (e.g., they live in the area or are otherwise affected) and have not already posted content about the emergency on the online social network. In particular embodiments, social-networking system 160 may send the safety-check prompt to more users in the second group as the current-prompting probability increases from lower probability intervals (e.g., 0.51-70) to higher probability intervals (e.g., 0.81-0.90). Although this disclosure describes sending a safety-check prompt to a second group of users in a particular manner, this disclosure contemplates sending a safety-check prompt to a second group of users in any suitable manner.

In particular embodiments, at each time interval (e.g., every ten minutes), social-networking system 160 may, in addition to re-calculating the current-prompting probability, determine the total number of users who have responded to the safety-check prompt. If the total number of users who have responded to the safety-check prompt exceeds a threshold number (e.g., 9,500 users), social-networking system 160 may send a safety-check prompt to all the users who are associated with the emergency event. Thus, social-networking system 160 may send a safety-check prompt to all the users who are associated with the emergency event in two cases: (1) when the current-prompting probability falls into the highest probability interval (e.g., 0.91-1.0), or (2) when the total number of users who have responded to the safety-check prompt exceeds a threshold number of users (e.g., 9,500). 9,500 is an example only and the threshold number of users needed to respond in order to send the safety-check prompt to all associated users may be any suitable number. Although this disclosure describes sending a safety-check prompt to "users," it may be more accurate to state that the safety-check prompt is sent to a user's client system 130, in the form of a notification or newsfeed item. Although this disclosure describes sending a safety-check prompt to a second group of users in a particular manner, this disclosure contemplates sending a safety-check prompt to a second group of users in any suitable manner.

FIG. 5 illustrates an example method 500 for determining to send a safety-check prompt based on user interaction. The method may begin at step 510, where the social-networking system 160 may identify an emergency event using any of the methods described herein. At step 520, the social-networking system may receive posts that are related to the emergency event. At step 530, the social-networking system 160 may determine whether a threshold number of users associated with the emergency event have posted content related to the emergency event. "Associated with the emergency event" may mean that the user is in the geographic area of the geographic event as determined by a GPS on his client system 130 or by his social graph information (e.g., by checking in at a location close to the emergency) or by otherwise being substantially affected by the emergency (e.g., the user is a victim or potential victim of a cyber attack because he owns a device that operates WINDOWS 10 and WINDOWS 10 was recently hacked). If a threshold number of users associated with the emergency event have posted content related to the emergency, the social-networking system may proceed to step 540. If a threshold number of users associated with the emergency event have posted content related to the emergency, the social-networking system may repeat step 520, and may receive posts related to the event until the threshold number of users has been met (if at all). At step 540, the social-networking system 160 may send a safety-check prompt to a first set of users according to the methods described herein. At step 550, the social-networking system 160 may determine a current-prompting probability based on one or more engagement metrics of the safety check prompt of the users who have received the safety-check prompt. This may not be limited to the first set of users only, but may account for all users who have received the safety-check prompt. Based on the current-prompting probability, social-networking system 160 may send the safety-check prompt to a particular number of users, as illustrated in steps 561-564, based on which probability interval corresponds to the current-prompting probability. At step 570, social-networking system 160 may determine whether the number of users who have responded to the safety-check prompt exceeds a threshold number of users (e.g., 9,500). If the number of users who have responded to the safety-check prompt has exceeded the threshold number, social-networking system 160 may send the safety-check prompt to all the users associated with the emergency event. If the number of users who have responded to the safety-check prompt has not exceeded the threshold number, social-networking system 160 may repeat step 550, and, in particular embodiments at regular intervals, re-calculate the current-prompting probability. This process may continue until the safety-check prompt is sent to all users associated with the emergency event, or until the current-prompting probability falls below a bottom threshold probability (e.g., 0.15), at which point the method may end. In particular embodiments, event if the current-prompting probability falls below a bottom threshold probability, social-networking system 160 may continue to determine the current-prompting probability at regular intervals for a predetermined amount of time based on the type of event, the number of people affected, or any other suitable factor. As an example and not by way of limitation, at 8:00 AM on a given day, social-networking event may identify a fire in Boston as an emergency, and may monitor the current-prompting probability, but calculate a current-prompting probability that is below the threshold level (e.g., 0.15) at 10:00 AM. Social-networking system may continue to monitor posts and responses to the safety-check prompt for a particular amount of time (e.g., 6 hours) in case the fire spreads or otherwise intensifies and affects more people. Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for determining to send a safety-check prompt based on user interaction including the particular steps of the method of FIG. 5, this disclosure contemplates any suitable method for determining to send a safety-check prompt based on user interaction including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6:
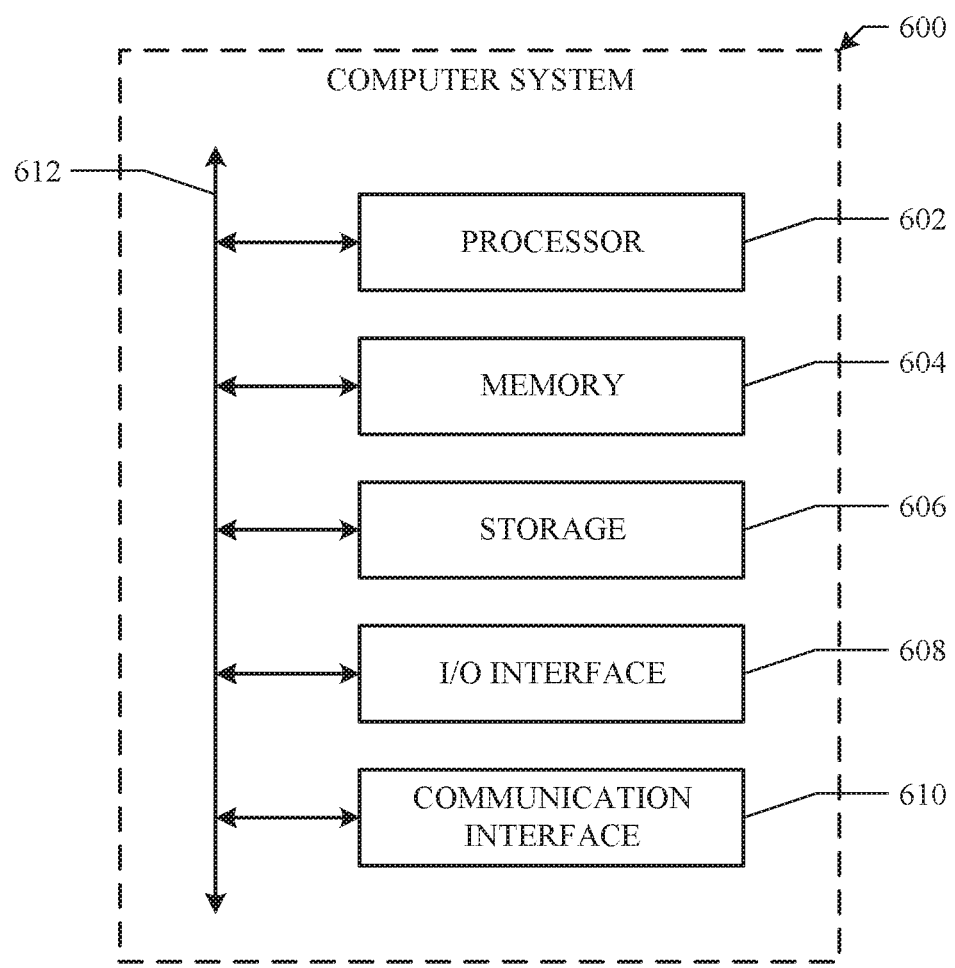
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
   by a computing device, detecting that a first set of users associated with an emergency event have posted content related to the emergency event on an online social network;
   by the computing device, sending a safety-check prompt to each of one or more users in the first set of users;
   by the computing device, determining a current-prompting probability based on one or more engagement metrics of the one or more users in the first set of users; and
   by the computing device, sending, in response to determining that the current-prompting probability is above a threshold probability, the safety-check prompt to each of a second set of users, wherein the second set of users comprises more users than the first set of users.

2. The method of claim 1, further comprising sending, in response to determining that the current-prompting probability is above a second threshold probability, the safety-check prompt to each of a third set of users, wherein the third set of users comprises more users than the second set of users and the second threshold probability is higher than the first threshold probability.

3. The method of claim 1, wherein the safety-check prompt comprises one or more selectable icons that enable a user to indicate a safety status associated with the user.

4. The method of claim 1, wherein identifying an emergency event comprises classifying, based on one or more emergency metrics, a plurality of items on an alert feed as either a qualifying emergency or as a non-qualifying emergency.

5. The method of claim 1, wherein the current-prompting probability is determined at regular intervals.

6. The method of claim 1, wherein the one or more engagement metrics comprise:
   a number of users in the first set of users who have interacted with the safety-check prompt;
   a number of users in the first set of users who have ignored or hid the safety-check prompt; or
   a number of impressions of the safety-check prompt.

7. The method of claim 1, wherein detecting that the first set of users associated with the emergency event have posted content related to the emergency event on the online social network comprises:
   extracting one or more text strings from the posted content; and
   applying a natural language analysis to determine that the text strings comprise one or more n-grams that are related to the emergency event.

8. The method of claim 1, wherein the emergency event is associated with a particular geographic location, and each user in the first set of users and each user in the second set of users is also associated with the particular geographic location.

9. The method of claim 1, wherein sending the safety check prompt to each of the one or more users in the first set of users comprises sending the safety check prompt to a random selection of users within the first set of users.

10. One or more computer-readable non-transitory storage media embodying software that is operable when executed to:
   detect that a first set of users associated with an emergency event have posted content related to the emergency event on an online social network;
   send a safety-check prompt to each of one or more users in the first set of users;
   determine a current-prompting probability based on one or more engagement metrics of the one or more users in the first set of users; and
   send, in response to determining that the current-prompting probability is above a threshold probability, the safety-check prompt to each of a second set of users, wherein the second set of users comprises more users than the first set of users.

11. The media of claim 10, wherein the software is further operable when executed to send, in response to determining that the current-prompting probability is above a second threshold probability, the safety-check prompt to each of a third set of users, wherein the third set of users comprises more users than the second set of users and the second threshold probability is higher than the first threshold probability.

12. The media of claim 10, wherein the safety-check prompt comprises one or more selectable icons that enable a user to indicate a safety status associated with the user.

13. The media of claim 10, wherein identifying an emergency event comprises classifying, based on one or more emergency metrics, a plurality of items on an alert feed as either a qualifying emergency or as a non-qualifying emergency.

14. The media of claim 10, wherein the current-prompting probability is determined at regular intervals.

15. The media of claim 10, wherein the one or more engagement metrics comprise:
   a number of users in the first set of users who have interacted with the safety-check prompt;
   a number of users in the first set of users who have ignored or hid the safety-check prompt; or
   a number of impressions of the safety-check prompt.

16. The media of claim 10, wherein the emergency event is associated with a particular geographic location, and each user in the first set of users and each user in the second set of users is also associated with the particular geographic location.

17. A system comprising: one or more processors; and a memory coupled to the processors comprising instructions executable by the processors, the processors being operable when executing the instructions to:
   detect that a first set of users associated with an emergency event have posted content related to the emergency event on an online social network;
   send a safety-check prompt to each of one or more users in the first set of users;
   determine a current-prompting probability based on one or more engagement metrics of the one or more users in the first set of users; and
   send, in response to determining that the current-prompting probability is above a threshold probability, the safety-check prompt to each of a second set of users, wherein the second set of users comprises more users than the first set of users.

18. The system of claim 17, wherein the processors are further operable when executing the instructions to send in response to determining that the current-prompting probability is above a second threshold probability, the safety-check prompt to each of a third set of users, wherein the third set of users comprises more users than the second set of users and the second threshold probability is higher than the first threshold probability.

19. The system of claim 17, wherein the safety-check prompt comprises one or more selectable icons that enable a user to indicate a safety status associated with the user.

20. The system of claim 17, wherein the current-prompting probability is determined at regular intervals.

* * * * *